United States Patent
Miyama et al.

(10) Patent No.: US 12,249,873 B2
(45) Date of Patent: Mar. 11, 2025

(54) ROTARY ELECTRIC MACHINE

(71) Applicant: Mitsubishi Electric Corporation, Tokyo (JP)

(72) Inventors: Yoshihiro Miyama, Tokyo (JP); Tomohira Takahashi, Tokyo (JP); Junji Kitao, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 312 days.

(21) Appl. No.: 17/851,243

(22) Filed: Jun. 28, 2022

(65) Prior Publication Data

US 2023/0123457 A1    Apr. 20, 2023

(30) Foreign Application Priority Data

Oct. 18, 2021  (JP) .................. 2021-170078

(51) Int. Cl.
| | |
|---|---|
| H02K 1/32 | (2006.01) |
| H02K 1/14 | (2006.01) |
| H02K 3/28 | (2006.01) |
| H02K 7/00 | (2006.01) |
| H02K 9/19 | (2006.01) |
| H02K 15/03 | (2006.01) |

(52) U.S. Cl.
CPC .............. *H02K 1/32* (2013.01); *H02K 1/146* (2013.01); *H02K 3/28* (2013.01); *H02K 7/003* (2013.01); *H02K 9/19* (2013.01); *H02K 15/03* (2013.01)

(58) Field of Classification Search
CPC ............ H02K 1/32; H02K 1/146; H02K 3/28; H02K 7/003; H02K 9/19; H02K 15/03; H02K 1/20; H02K 1/27; Y02T 10/64

See application file for complete search history.

(56) References Cited

U.S. PATENT DOCUMENTS

| | | | | |
|---|---|---|---|---|
| 2015/0137632 A1* | 5/2015 | Takahashi | ................ | H02K 1/28 310/216.106 |
| 2018/0198334 A1* | 7/2018 | Sano | ........................ | H02K 1/28 |
| 2019/0319514 A1* | 10/2019 | Williams | ................ | F01D 5/225 |

FOREIGN PATENT DOCUMENTS

| | | |
|---|---|---|
| JP | 2005-253275 A | 9/2005 |
| JP | 2009-177861 A | 8/2009 |

(Continued)

OTHER PUBLICATIONS

Notification of reasons for refusal dated Sep. 27, 2022 from the Japanese Patent Office in Japanese Application No. 2021-170078.

*Primary Examiner* — Thomas Truong

(74) *Attorney, Agent, or Firm* — Sughrue Mion, PLLC

(57) ABSTRACT

The rotary electric machine includes: a rotor core configured having electromagnetic steel sheets; a stator core having electromagnetic steel sheets; a magnet inserted in each of a plurality of through holes; and a magnetic end plate in contact with one or each of an end surface on one side in the axial direction of the rotor core and an end surface on another side in the axial direction of the rotor core, and having a single magnetic sheet or a plurality of magnetic sheets stacked in the axial direction, wherein heat generated from the magnetic end plate owing to eddy current that is generated in the magnetic end plate by magnetic flux from the stator core is equal to or lower than heat generated from the rotor core owing to eddy current that is generated in the rotor core by magnetic flux from the stator core.

16 Claims, 14 Drawing Sheets

(56) References Cited

FOREIGN PATENT DOCUMENTS

| JP | 2009-232535 A | | 10/2009 |
|----|---------------|---|---------|
| JP | 2010-11621 A | | 1/2010 |
| JP | 2010011621 A | * | 1/2010 |
| JP | 2019-187063 A | | 10/2019 |
| WO | 2021/053901 A1 | | 3/2021 |

* cited by examiner

ROTARY ELECTRIC MACHINE

BACKGROUND OF THE INVENTION

1. Field of the Invention

The present disclosure relates to a rotary electric machine.

2. Description of the Background Art

A large number of permanent-magnet-type rotary electric machines that are advantageous in decreasing size and increasing output have been used as industrial rotary electric machines and rotary electric machines for electric automobiles or hybrid automobiles. A permanent-magnet-type rotary electric machine has a permanent magnet in a rotor thereof. In the rotor of the permanent-magnet-type rotary electric machine, an end plate made of metal may further be provided on both or one of end surfaces of a rotor core. The end plate has various functions such as a function of fixing the rotor core or the permanent magnet and a function of defining a path for a coolant for cooling the rotary electric machine. During operation of the permanent-magnet-type rotary electric machine, eddy current might be generated in the end plate when a leakage magnetic flux generated from a stator core passes through the end plate. If eddy current is generated, the end plate generates heat. Thus, the efficiency of the rotary electric machine decreases.

In particular, if the end plate more excessively generates heat than the rotor core, the heat is transmitted to the permanent magnet embedded in the rotor core so that the permanent magnet might experience unexpected irreversible demagnetization. Meanwhile, if the end plate is thermally expanded, thermal expansion leads to, for example, decrease in the function of fixing the permanent magnet by the end plate. Thus, excessive heat generation from the end plate could cause a serious failure of the rotary electric machine. Therefore, heat generation from the end plate due to eddy current is desirably suppressed such that heat generated from the end plate becomes equal to or lower than heat generated from the rotor core. A configuration has been disclosed in which an end plate is slit or knurled in order to block an eddy current path in the end plate and suppress heat generation from the end plate (see, for example, Patent Document 1).

Patent Document 1: Japanese Laid-Open Patent Publication No. 2005-253275

In the above Patent Document 1, the end plate is slit or knurled, and thus the eddy current path in the end plate can be blocked. Therefore, heat generation from the end plate can be suppressed. However, Patent Document 1 does not present any quantitative explanations about the effect of suppressing heat generation from the end plate. Thus, a drawback arises in that there is uncertainty as to whether the heat generated from the end plate becomes equal to or lower than the heat generated from the rotor core owing to eddy current that is generated in the rotor core by magnetic flux from the stator core. In addition, a drawback arises in that it is impossible to prevent a serious failure of the rotary electric machine that could occur if the heat generated from the end plate is higher than the heat generated from the rotor core.

SUMMARY OF THE INVENTION

Considering this, an object of the present disclosure is to provide a permanent-magnet-type rotary electric machine in which: heat generated from an end plate is equal to or lower than heat generated from a rotor core; and a failure is prevented.

A rotary electric machine according to the present disclosure includes: a rotor core configured to rotate integrally with a rotation shaft and having electromagnetic steel sheets stacked in an axial direction; a stator core having electromagnetic steel sheets stacked in the axial direction, the stator core being disposed radially outward of the rotor core so as to be apart from the rotor core; a magnet inserted in each of a plurality of through holes which penetrate the rotor core in the axial direction and which are located to be apart from each other in a circumferential direction; and a magnetic end plate in contact with one or each of an end surface on one side in the axial direction of the rotor core and an end surface on another side in the axial direction of the rotor core, and having a single magnetic sheet or a plurality of magnetic sheets stacked in the axial direction, wherein heat generated from the magnetic end plate owing to eddy current that is generated in the magnetic end plate by magnetic flux from the stator core is equal to or lower than heat generated from the rotor core owing to eddy current that is generated in the rotor core by magnetic flux from the stator core.

The rotary electric machine according to the present disclosure includes: a rotor core having a magnet; a stator core; and a magnetic end plate in contact with one or each of an end surface on one side in the axial direction of the rotor core and an end surface on another side in the axial direction of the rotor core, wherein heat generated from the magnetic end plate owing to eddy current that is generated in the magnetic end plate by magnetic flux from the stator core is equal to or lower than heat generated from the rotor core owing to eddy current that is generated in the rotor core by magnetic flux from the stator core. This makes it possible to provide a permanent-magnet-type rotary electric machine in which irreversible demagnetization of the magnet and decrease of the function of fixing the magnet by the magnetic end plate are suppressed so that a failure is prevented.

DETAILED DESCRIPTION OF THE PREFERRED EMBODIMENTS OF THE INVENTION

Figure 1:
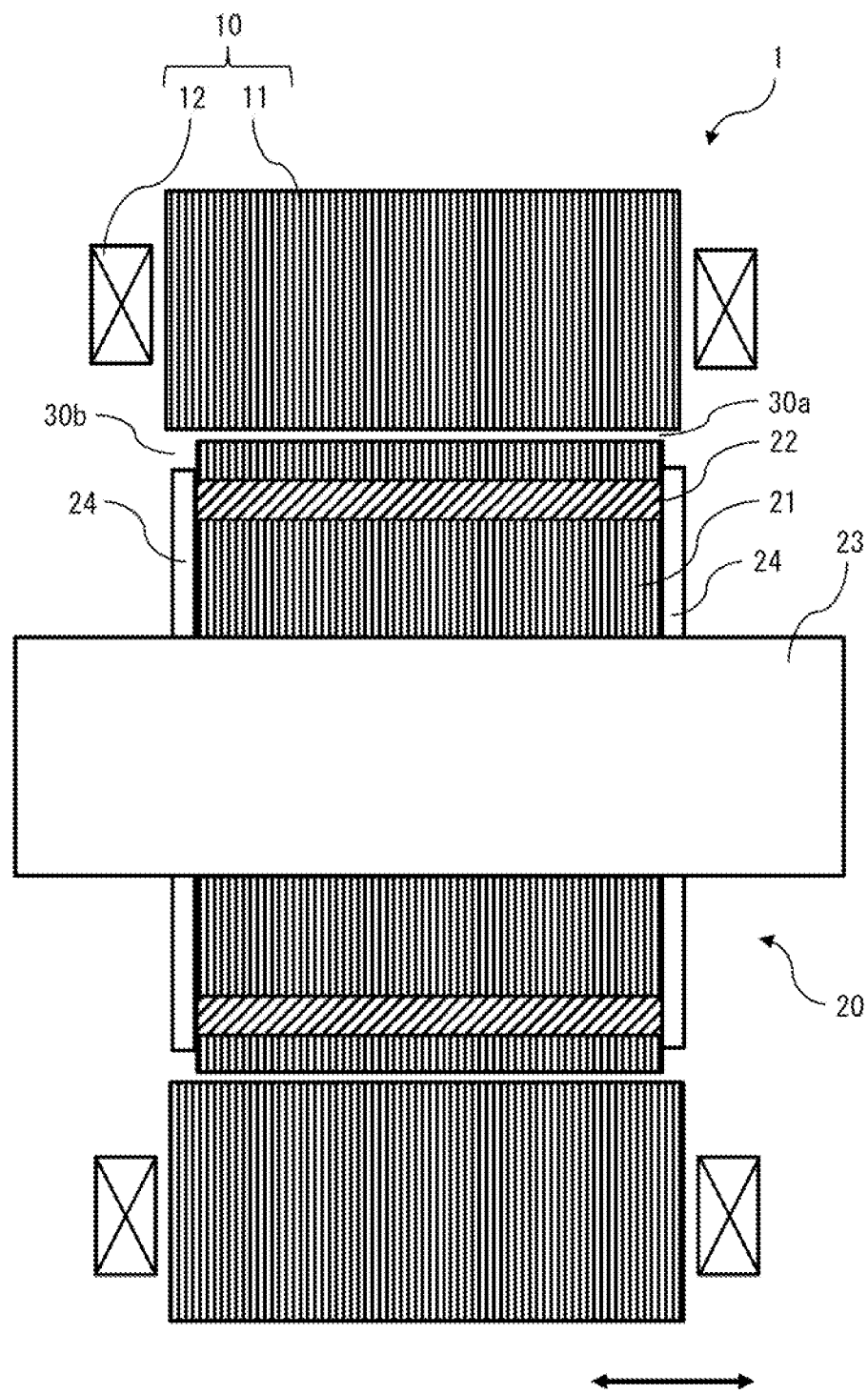
FIG. 1 is a cross-sectional view schematically showing a rotary electric machine according to a first embodiment.

Hereinafter, rotary electric machines according to embodiments of the present disclosure will be described with reference to the drawings. Description will be given while the same or corresponding members and parts in the drawings are denoted by the same reference characters.

First Embodiment

Figure 2:
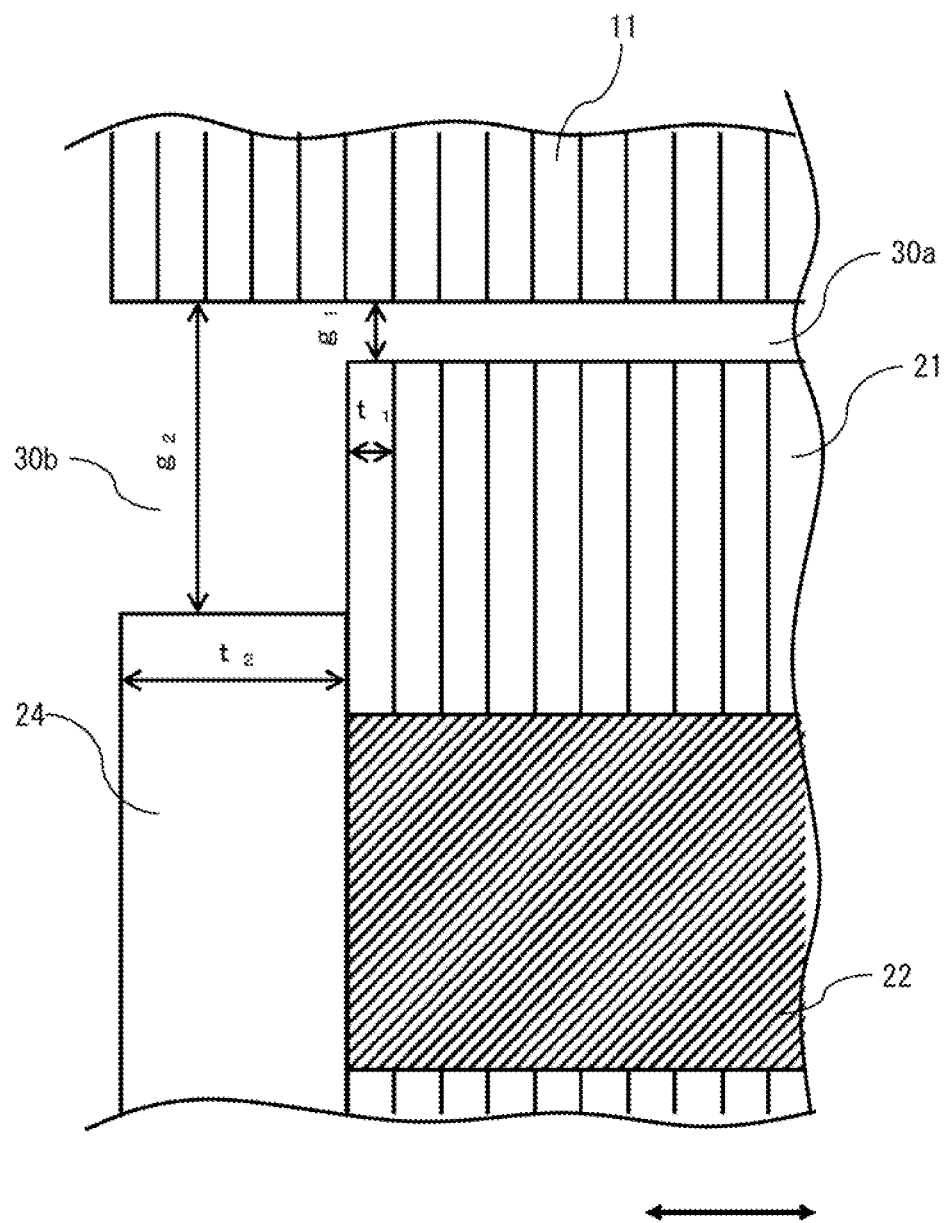
FIG. 2 is a cross-sectional view showing a major part of the rotary electric machine according to the first embodiment.
Figure 3:
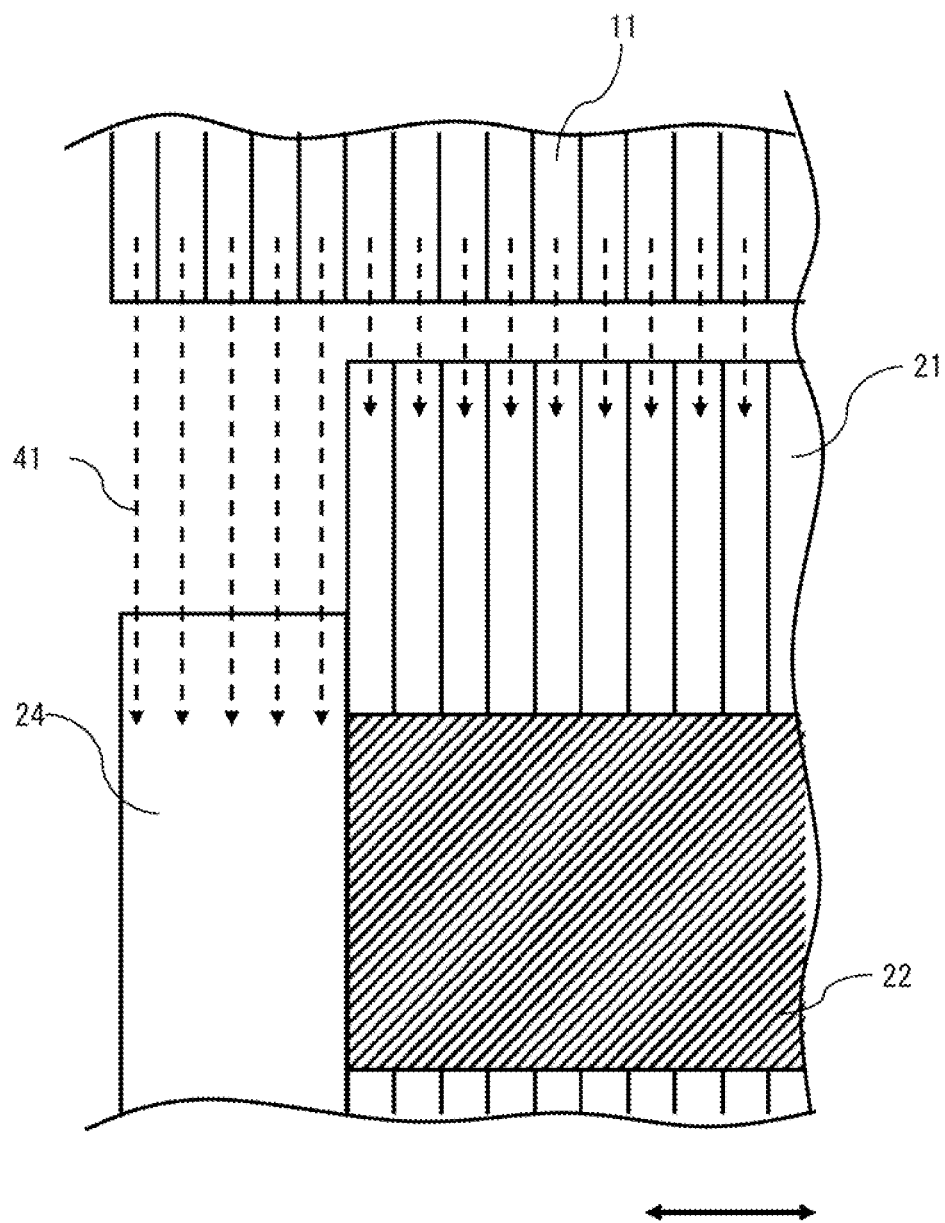
FIG. 3 is a diagram showing flows of magnetic fluxes in the major part of the rotary electric machine according to the first embodiment.
Figure 4:
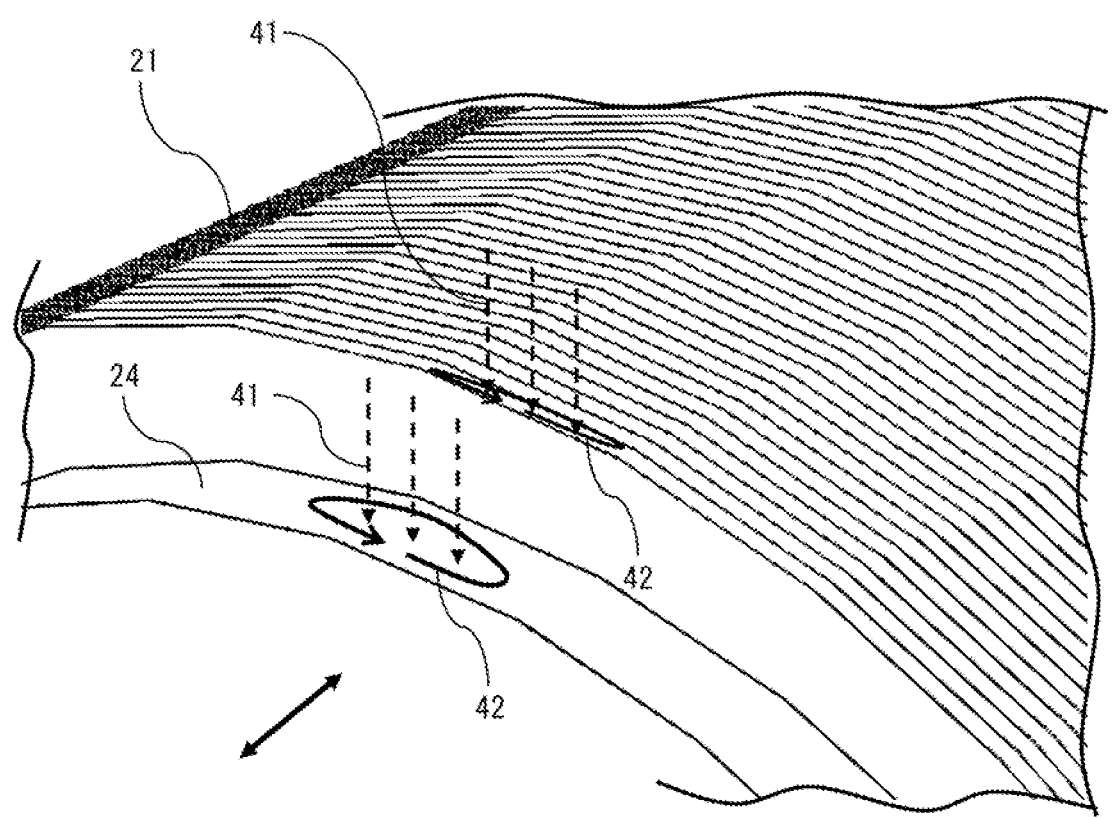
FIG. 4 is a diagram showing flows of eddy currents in the major part of the rotary electric machine according to the first embodiment.
Figure 5:
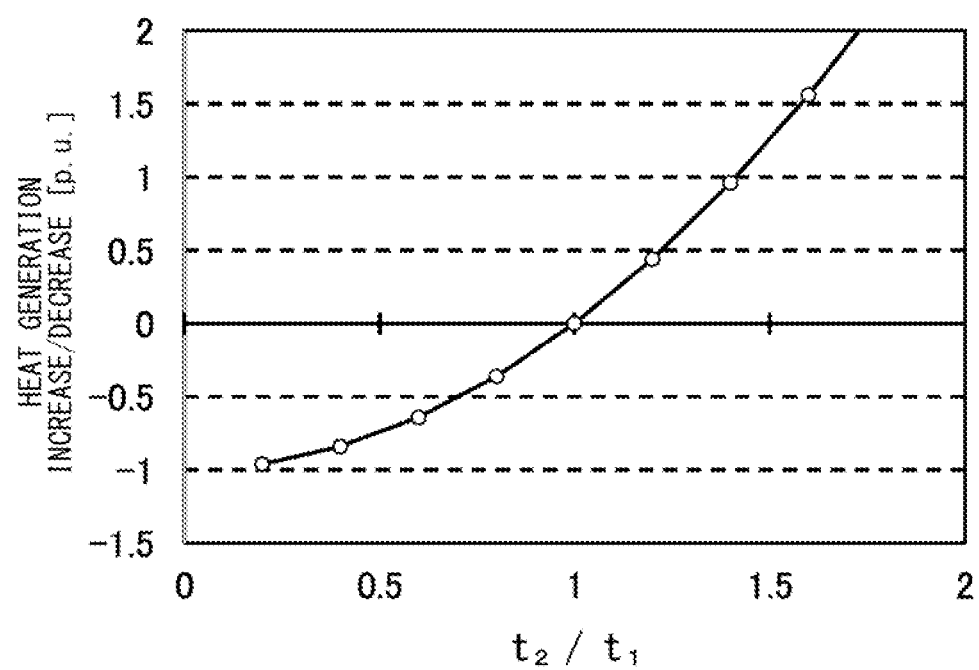
FIG. 5 is a diagram showing the relationship between generated heat and the thicknesses of an electromagnetic steel sheet of a rotor core and a magnetic end plate in the rotary electric machine according to the first embodiment.
Figure 6:
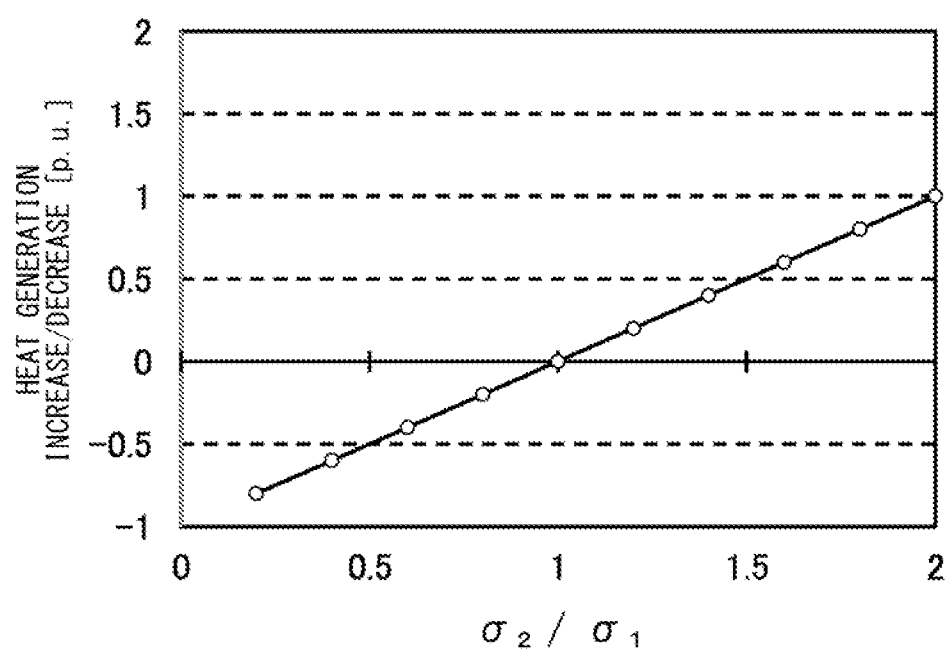
FIG. 6 is a diagram showing the relationship between generated heat and the electrical conductivities of the electromagnetic steel sheet of the rotor core and the magnetic end plate in the rotary electric machine according to the first embodiment.
Figure 7:
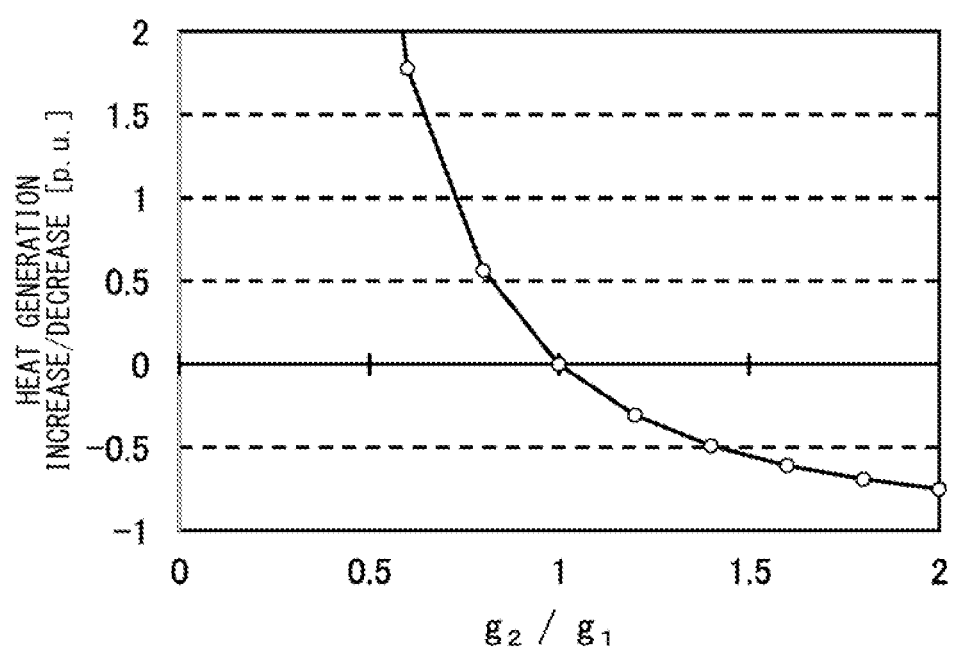
FIG. 7 is a diagram showing the relationship between generated heat, and a rotor core distance and an end plate distance, in the rotary electric machine according to the first embodiment.
Figure 8:
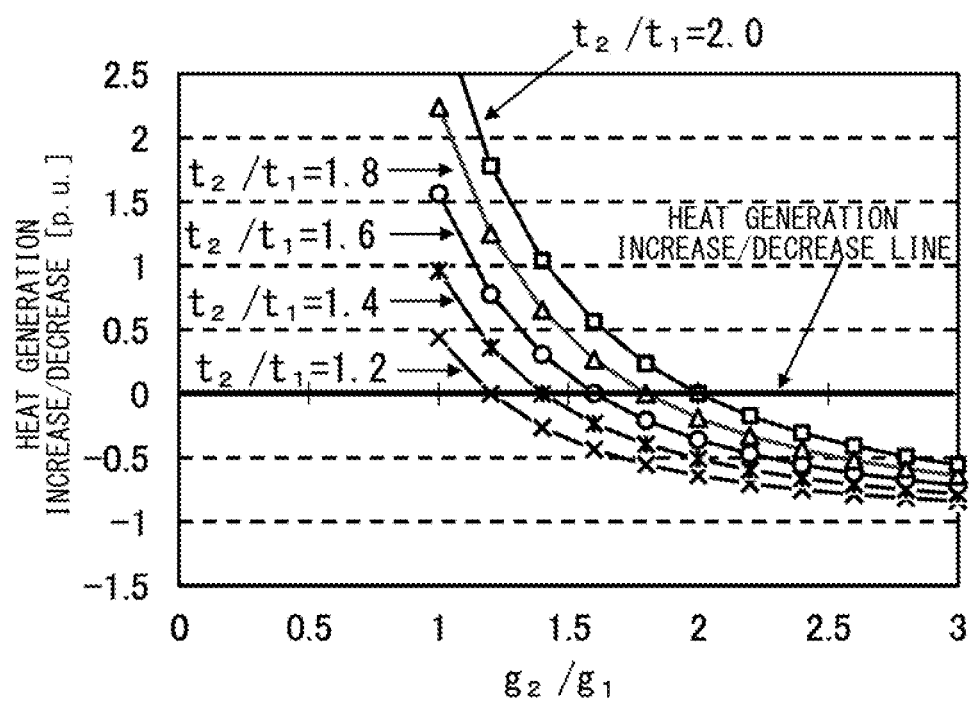
FIG. 8 is a diagram showing the relationship between generated heat, and the rotor core distance and the end plate distance, in the rotary electric machine according to the first embodiment.
Figure 9:
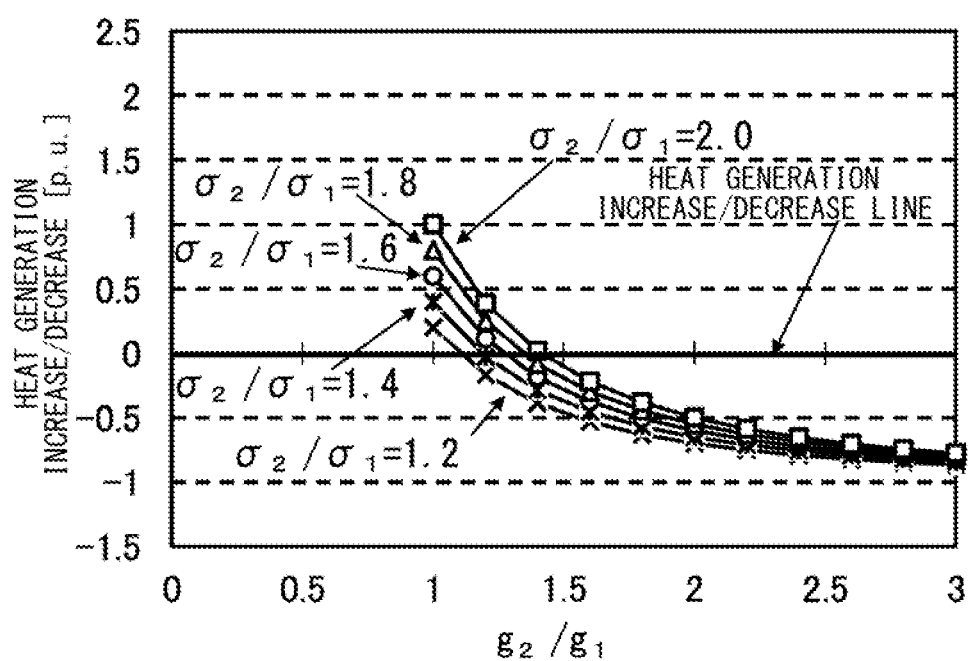
FIG. 9 is a diagram showing the relationship between generated heat, and the rotor core distance and the end plate distance, in the rotary electric machine according to the first embodiment.

FIG. 1 is a cross-sectional view schematically showing a rotary electric machine 1 according to a first embodiment, and is a diagram in which the rotary electric machine 1 is cut in an axial direction. FIG. 2 is a cross-sectional view showing a major part of the rotary electric machine 1. FIG. 3 is a diagram showing flows of magnetic fluxes in the major part of the rotary electric machine 1. FIG. 4 is a diagram showing flows of eddy currents 42 in the major part of the rotary electric machine 1. FIG. 5 is a diagram showing the relationship between generated heat and the thicknesses of an electromagnetic steel sheet of a rotor core 21 and a magnetic end plate 24 in the rotary electric machine 1. FIG. 6 is a diagram showing the relationship between generated heat and the electrical conductivities of the electromagnetic steel sheet of the rotor core 21 and the magnetic end plate 24 in the rotary electric machine 1. FIG. 7 to FIG. 9 are each a diagram showing the relationship between generated heat, and a rotor core distance 30a and an end plate distance 30b, in the rotary electric machine 1. The rotary electric machine 1 is a permanent-magnet-type rotary electric machine having a magnet 22 in a rotor 20 thereof.

<Rotary Electric Machine 1>

The rotary electric machine 1 includes: the rotor 20 having a columnar shape; and a stator 10 disposed radially outward of the rotor 20. Since a minute gap is present between the rotor 20 and the stator 10, the rotor 20 is rotatable. The direction of an arrow shown at the lower right in FIG. 1 is the axial direction. In the other drawings as well, arrows shown in the drawings indicate the axial direction.

The rotor 20 includes the rotor core 21, the magnet 22, a shaft 23, and the magnetic end plate 24. The rotor core 21 has a plurality of electromagnetic steel sheets stacked in the axial direction and rotates integrally with the shaft 23 which is a rotation shaft. Surfaces, of each electromagnetic steel sheet of the rotor core 21, that are perpendicular to the axial direction are each coated with an insulating coating. Therefore, the plurality of electromagnetic steel sheets are electrically independent of each other in the axial direction. The magnet 22 is a permanent magnet and inserted in each of a plurality of through holes which penetrate the rotor core 21 in the axial direction and which are located to be apart from each other in a circumferential direction.

The magnetic end plate 24 is in contact with one or each of an end surface on one side in the axial direction of the rotor core 21 and an end surface on another side in the axial direction of the rotor core 21, and has a single magnetic sheet or a plurality of magnetic sheets stacked in the axial direction. The magnetic end plate 24 is made in, for example, a circular sheet shape by using an electromagnetic steel sheet. The magnetic end plate 24 has a function of fixing the magnet 22 and defines flows of magnetic fluxes around the magnetic end plate 24. The rotary electric machine 1 according to the present embodiment shown in FIG. 1 includes a magnetic end plate 24 composed of a single magnetic sheet in contact with each of the end surface on the one side in the axial direction of the rotor core 21 and the end surface on the other side in the axial direction of the rotor core 21. The rotary electric machine 1 may include, in addition to the magnetic end plate 24, a sheet-shaped end plate made of a non-magnetic material. By increasing the number of the end plates, fixation of the magnet 22 can be strengthened. By avoiding limitation to magnetic materials, the range for selection of materials is broadened, and increase of the weight of the rotary electric machine 1 can be suppressed depending on the selected material. The magnetic end plate 24 does not necessarily have to be disposed on each side in the axial direction of the rotor core 21, and may be disposed on only one side.

The stator 10 includes a stator core 11 and a coil 12. The stator core 11 has a plurality of electromagnetic steel sheets stacked in the axial direction and is disposed radially outward of the rotor core 21 so as to be apart from the rotor core 21. The coil 12 is provided so as to be wound on the stator core 11.

FIG. 2 is an enlarged view of a portion around a radially outer side of the magnetic end plate 24. The distance in the radial direction between the location in the radial direction of a radially inner end surface of the stator core 11 and the location in the radial direction of a radially outer end surface of the rotor core 21 is defined as the rotor core distance 30a, and the distance in the radial direction between the location in the radial direction of the radially inner end surface of the stator core 11 and the location in the radial direction of a radially outer end surface of the magnetic end plate 24 is defined as the end plate distance 30b. As shown in FIG. 2, the radially outer end surface of the magnetic end plate 24 is located radially inward of the radially outer end surface of the rotor core 21. With this configuration, the end plate distance 30b is longer than the rotor core distance 30a. Meanwhile, the radially outer end surface of the magnetic end plate 24 is located radially outward of a radially inner end surface of the magnet 22. With this configuration, the magnetic end plate 24 and the magnet 22 are in contact with each other, and thus the magnet 22 can be held inside the rotor core 21.

<Eddy Current and Heat Generation>

A principle of generation of eddy current that causes heat generation will be described. When a magnetic flux interlinks with an object, electromotive force is generated on the basis of Faraday's law of electromagnetic induction so that eddy current is generated in such a direction as to hinder the magnetic flux that has interlinked. Magnetic fluxes 41 flowing from the stator core 11 to the rotor core 21 and the magnetic end plate 24 are indicated by broken-line arrows in FIG. 3 which is the same enlarged view as FIG. 2. FIG. 4 is a perspective view of portions of the rotor core 21 and the magnetic end plate 24 shown in FIG. 3. As shown in FIG. 4, eddy currents 42 generated in the rotor core 21 and the magnetic end plate 24 flow so as to whirl perpendicularly to the magnetic fluxes 41 flowing in and horizontally with respect to the axial direction. Each one of the electromagnetic steel sheets of the rotor core 21 is electrically independent, and thus each eddy current 42 flows so as to whirl within a corresponding one of the electromagnetic steel sheets.

If the eddy current 42 is generated, the magnetic end plate 24 and the electromagnetic steel sheet of the rotor core 21 generate heat. In particular, if the magnetic end plate 24 generates higher heat than the rotor core 21, the heat is transmitted to the magnet 22 of the rotor core 21, and thus the magnet 22 might experience irreversible demagnetization. In addition, if the magnetic end plate 24 is thermally expanded, the function of fixing the magnet 22 by the magnetic end plate 24 decreases. Heat generated from the magnetic end plate 24 could cause a failure of the rotary electric machine 1 in this manner, and thus heat generation from the magnetic end plate 24 due to the eddy current 42 is desirably suppressed such that heat generated from the magnetic end plate 24 becomes equal to or lower than heat generated from the rotor core 21.

<Suppression of Heat Generation from Magnetic End Plate 24>

The thickness per electromagnetic steel sheet of the rotor core 21, the thickness per magnetic sheet of the magnetic end plate 24, the electrical conductivity of the electromagnetic steel sheet of the rotor core 21, the electrical conductivity of the magnetic sheet of the magnetic end plate 24, the rotor core distance 30a, and the end plate distance 30b are set such that heat generated from the magnetic end plate 24 owing to eddy current that is generated in the magnetic end plate 24 by magnetic flux from the stator core 11 becomes equal to or lower than heat generated from the rotor core 21 owing to eddy current that is generated in the rotor core 21 by magnetic flux from the stator core 11.

At least one magnetic sheet of the magnetic end plate 24 satisfies $$((t_2^2 \cdot \sigma_2)/(t_1^2 \cdot \sigma_1)) \leq (g_2^2/g_1^2) \quad (1),$$

whereby the heat generated from the magnetic end plate 24 owing to eddy current that is generated in the magnetic end plate 24 by magnetic flux from the stator core 11 can be set to be equal to or lower than the heat generated from the rotor core 21 owing to eddy current that is generated in the rotor core 21 by magnetic flux from the stator core 11. In expression (1), $t_1$ represents the thickness per electromagnetic steel sheet of the rotor core 21, $t_2$ represents the thickness per magnetic sheet of the magnetic end plate 24, $\sigma_1$ represents the electrical conductivity per electromagnetic steel sheet of the rotor core 21, $\sigma_2$ represents the electrical conductivity per magnetic sheet of the magnetic end plate 24, $g_1$ represents the rotor core distance 30a, and $g_2$ represents the end plate distance 30b. The thickness $t_1$ of the electromagnetic steel sheet, the thickness $t_2$ of the magnetic sheet, the electrical conductivity $\sigma_1$ of the electromagnetic steel sheet, the electrical conductivity $\sigma_2$ of the magnetic sheet, the rotor core distance $g_1$, and the end plate distance $g_2$ are set such that expression (1) is satisfied.

The details of expression (1) will be described. In FIG. 4, the amount of a magnetic flux 41 that flows into one electromagnetic steel sheet of the rotor core 21 or the magnetic end plate 24 is proportional to the thickness of the one electromagnetic steel sheet or the magnetic end plate 24. Further, the magnitude of the electromotive force is proportional to a change in the amount of the magnetic flux per unit time on the basis of Faraday's law of electromagnetic induction. Therefore, the magnitude of the electromotive force generated in the one electromagnetic steel sheet of the rotor core 21 or the magnetic end plate 24 is proportional to the thickness of the one electromagnetic steel sheet or the magnetic end plate 24. Further, a resistance value on a path of the eddy current generated in the one electromagnetic steel sheet of the rotor core 21 or the magnetic end plate 24 is inversely proportional to the thickness of the one electromagnetic steel sheet or the magnetic end plate 24. The eddy current flowing in the one electromagnetic steel sheet of the rotor core 21 or the magnetic end plate 24 is obtained by dividing the electromotive force by the resistance value on the basis of Ohm's law. Therefore, the magnitude of the eddy current flowing in the one electromagnetic steel sheet of the rotor core 21 or the magnetic end plate 24 is proportional to the second power of the thickness of the one electromagnetic steel sheet or the magnetic end plate 24. Further, a loss based on the eddy current generated in the one electromagnetic steel sheet of the rotor core 21 or the magnetic end plate 24 is obtained as the product of the electromotive force and the eddy current. Therefore, the loss based on the eddy current in the one electromagnetic steel sheet of the rotor core 21 or the magnetic end plate 24 is proportional to the third power of the thickness of the one electromagnetic steel sheet or the magnetic end plate 24. Further, the volume of the one electromagnetic steel sheet of the rotor core 21 or the magnetic end plate 24 is inversely proportional to the thickness of the one electromagnetic steel sheet or the magnetic end plate 24. As a result, the loss based on the eddy current per unit volume of the one electromagnetic steel sheet of the rotor core 21 or the magnetic end plate 24 is proportional to the second power of the thickness of the one electromagnetic steel sheet or the magnetic end plate 24.

Further, the resistance value of the one electromagnetic steel sheet of the rotor core 21 or the magnetic end plate 24 is inversely proportional to the electrical conductivity of the one electromagnetic steel sheet or the magnetic end plate 24. If the electromotive force generated in the one electromagnetic steel sheet of the rotor core 21 or the magnetic end plate 24 is fixed, the magnitude of the eddy current flowing in the one electromagnetic steel sheet or the magnetic end plate 24 is proportional to the electrical conductivity of the one electromagnetic steel sheet or the magnetic end plate 24 on the basis of Ohm's law. The loss based on the eddy current generated in the one electromagnetic steel sheet of the rotor core 21 or the magnetic end plate 24 is obtained as the product of the electromotive force and the eddy current. As a result, the loss based on the eddy current per unit volume of the one electromagnetic steel sheet of the rotor core 21 or the magnetic end plate 24 is proportional to the electrical conductivity of the one electromagnetic steel sheet or the magnetic end plate 24.

Further, magnetic resistances in the rotor core distance 30a and the end plate distance 30b are proportional to the lengths of the rotor core distance 30a and the end plate distance 30b. Furthermore, in many rotary electric machines magnetically designed optimally, the magnetic resistances in the rotor core distance 30a and the end plate distance 30b are the highest magnetic resistances and can be regarded as the only magnetic resistances, on paths of the magnetic fluxes. Thus, the amount of the magnetic flux 41 that flows into the one electromagnetic steel sheet of the rotor core 21 or the magnetic end plate 24 is inversely proportional to the length of the corresponding one of the rotor core distance 30a and the end plate distance 30b. Therefore, the magnitude of the electromotive force generated in the one electromagnetic steel sheet of the rotor core 21 or the magnetic end plate 24 is also inversely proportional to the length of the corresponding one of the rotor core distance 30a and the end plate distance 30b. If the resistance value of the one electromagnetic steel sheet of the rotor core 21 or the magnetic end plate 24 is fixed, the magnitude of the eddy current is also inversely proportional to the length of the corresponding one of the rotor core distance 30a and the end plate distance 30b on the basis of Ohm's law. The loss based on the eddy current generated in the one electromagnetic steel sheet of the rotor core 21 or the magnetic end plate 24 is obtained as the product of the electromotive force and the eddy current. As a result, the loss based on the eddy current per unit volume of the one electromagnetic steel sheet of the rotor core 21 or the magnetic end plate 24 is inversely proportional to the second power of the length of the corresponding one of the rotor core distance 30a and the end plate distance 30b.

Judging from the above conditions, the loss based on the eddy current per unit volume of the one electromagnetic steel sheet of the rotor core 21 or the magnetic end plate 24 is proportional to the second power of the thickness of the one electromagnetic steel sheet or the magnetic end plate 24 and the electrical conductivity of the one electromagnetic steel sheet or the magnetic end plate 24 and is inversely proportional to the second power of the length of the corresponding one of the rotor core distance 30a and the end plate distance 30b. The magnetic end plate 24 is made of a magnetic material in the same manner as the rotor core 21. In many cases, heat capacities of the magnetic end plate 24 and the rotor core 21 are approximately equal to each other, and the temperatures thereof increase equally depending on the loss per unit volume.

Further description will be given with reference to the drawings. Here, heat generated per electromagnetic steel sheet of the rotor core 2 is defined as 1. FIG. 5 shows the relationship of increase/decrease in the heat generation amount of the magnetic end plate with respect to $t_2/t_1$ in the case of $\sigma_2/\sigma_1 = g_2/g_1 = 1$. FIG. 6 shows the relationship of increase/decrease in the heat generation amount of the magnetic end plate with respect to $\sigma_2/\sigma_1$ in the case of $t_2/t_1 = g_2/g_1 = 1$. FIG. 7 shows the relationship of increase/decrease in the heat generation amount of the magnetic end plate with respect to $g_2/g_1$ in the case of $t_2/t_1 = \sigma_2/\sigma_1 = 1$. In any of FIG. 5 to FIG. 7, if a heat generation increase/decrease indicating an increase/decrease in the heat generation amount in the vertical axis takes a positive value, this means that generated heat increases by the proportion of the positive value. Meanwhile, if the heat generation increase/decrease takes a negative value, this means that the generated heat decreases by the proportion of the negative value. FIG. 5 and FIG. 6 show that the heat generated from the magnetic end plate increases in association with increase in $t_2/t_1$ and $\sigma_2/\sigma_1$. Meanwhile, FIG. 7 shows that the heat generated from the magnetic end plate decreases in association with increase in $g_2/g_1$. If the thickness of the magnetic end plate 24 needs to be made larger than the thickness of the electromagnetic steel sheet of the rotor core 21 in consideration of a problem in strength, or if the electrical conductivity of the magnetic end plate 24 needs to be made higher than the electrical conductivity of the electromagnetic steel sheet of the rotor core 21 in consideration of a problem in material cost, the heat generated from the magnetic end plate can be decreased by adjusting $g_2/g_1$.

FIG. 8 shows the relationship of increase/decrease in the heat generation amount of the magnetic end plate with respect to $g_2/g_1$ in the case where $\sigma_2/\sigma_1 = 1$ is satisfied and a change is made such that $t_2/t_1 > 1$ is satisfied. A horizontal axis at which increase/decrease in the heat generation amount is 0, is defined as a heat generation increase/decrease line. A value higher than this line indicates that the generated heat has increased, and a value lower than this line indicates that the generated heat has decreased. Even if $t_2/t_1$ becomes higher than 1, the heat generation increase/decrease value can be decreased to be equal to or smaller than 0 by increasing $g_2/g_1$ accordingly as well. However, a higher $t_2/t_1$ requires $g_2/g_1$ to be also higher.

FIG. 9 shows the relationship of increase/decrease in the heat generation amount of the magnetic end plate with respect to $g_2/g_1$ in the case where $t_2/t_1 = 1$ is satisfied and a change is made such that $\sigma_2/\sigma_1 > 1$ is satisfied. In the same manner as in the case where the change is made such that $t_2/t_1 > 1$ is satisfied, even if $\sigma_2/\sigma_1$ becomes higher than 1, the heat generation increase/decrease value can be decreased to be equal to or smaller than 0 by increasing $g_2/g_1$ accordingly as well. However, a higher $\sigma_2/\sigma_1$ requires $g_2/g_1$ to be also higher.

From the relationship in which the loss based on the eddy current per unit volume of the one electromagnetic steel sheet of the rotor core 21 or the magnetic end plate 24 is proportional to the second power of the thickness of the one electromagnetic steel sheet or the magnetic end plate 24 and the electrical conductivity of the one electromagnetic steel sheet or the magnetic end plate 24 and is inversely proportional to the second power of the length of the corresponding gap, the outer diameter of the magnetic end plate 24 is favorably determined such that a fraction having the second power of the length of the rotor core distance 30a as a denominator and having the second power of the length of the end plate distance 30b as a numerator becomes larger than a value obtained by multiplying a fraction having the second power of the thickness of the magnetic end plate 24 as a numerator and having the second power of the thickness of the rotor core 21 as a denominator and a fraction having the electrical conductivity of the magnetic end plate 24 as a numerator and having the electrical conductivity of the rotor core 21 as a denominator, in order to set the heat generated from the magnetic end plate 24 to be lower than the heat generated from the rotor core 21. That is, expression (1) only has to be satisfied.

<Modifications>

Figure 10:
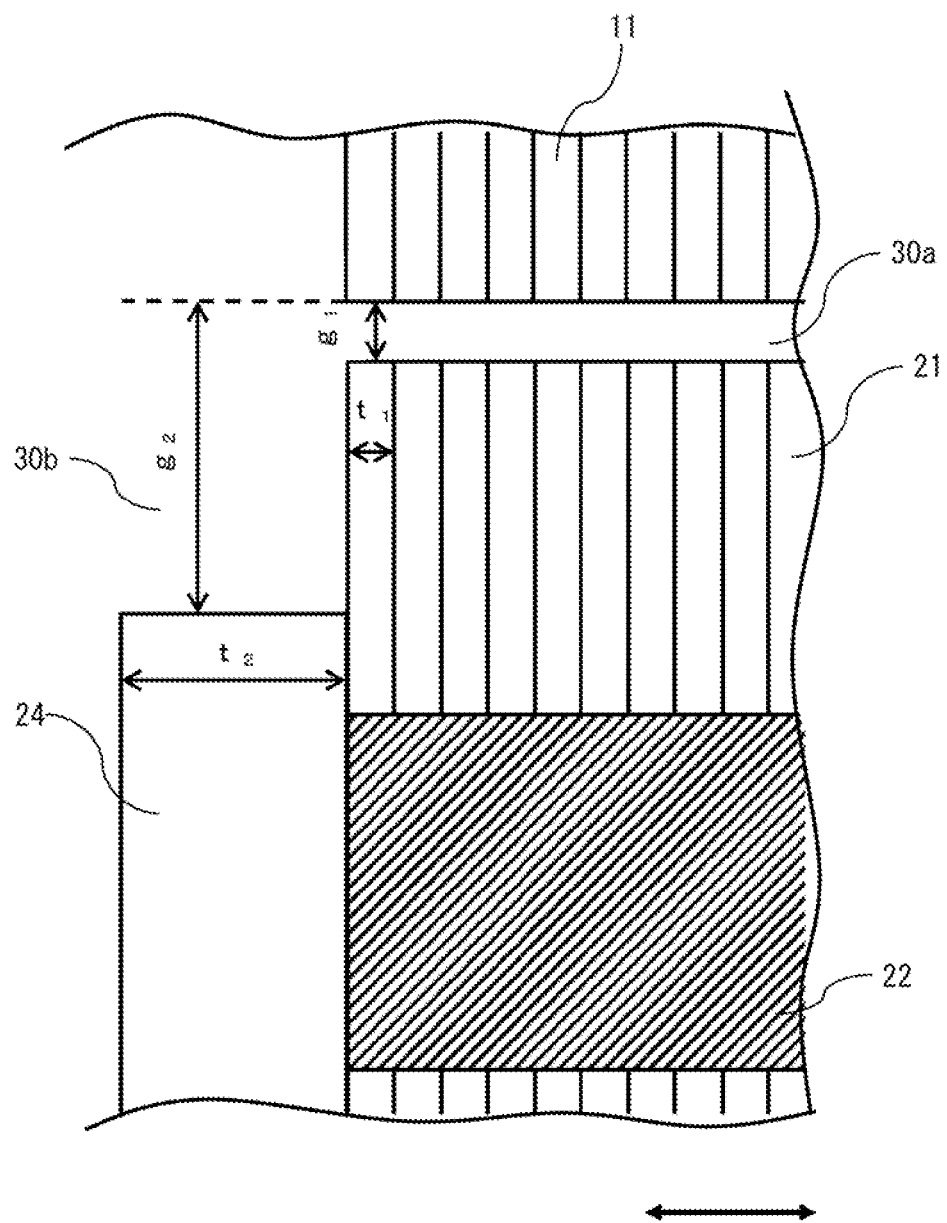
FIG. 10 is a cross-sectional view showing a major part of another rotary electric machine according to the first embodiment.

Modifications will be described. In the configuration shown in FIG. 2, the radially inner end surface of the stator core 11 and the radially outer end surface of the magnetic end plate 24 face each other in the radial direction. However, the present disclosure is not limited to the configuration in which both end surfaces face each other. As shown in FIG. 10, the radially inner end surface of the stator core 11 and the radially outer end surface of the magnetic end plate 24 do not have to face each other in the radial direction. In the same manner as in the case of FIG. 2, the end plate distance 30b is defined as the distance in the radial direction between the location (a broken line in FIG. 10) in the radial direction of the radially inner end surface of the stator core 11 and the location in the radial direction of the radially outer end surface of the magnetic end plate 24. In FIG. 10, the radially inner end surface of the stator core 11 and the radially outer end surface of the magnetic end plate 24 do not face each other in the radial direction. Thus, the distance between the radially inner end surface of the stator core 11 and the radially outer end surface of the magnetic end plate 24 is longer than the end plate distance 30b. Therefore, the magnetic fluxes 41 that flow into the magnetic end plate 24 from the stator core 11 do not increase more than in the configuration shown in FIG. 2. Consequently, in the configuration shown in FIG. 10, the effect of setting the heat generated from the magnetic end plate 24 to be lower than the heat generated from the rotor core 21, can be further obtained.

Figure 11:
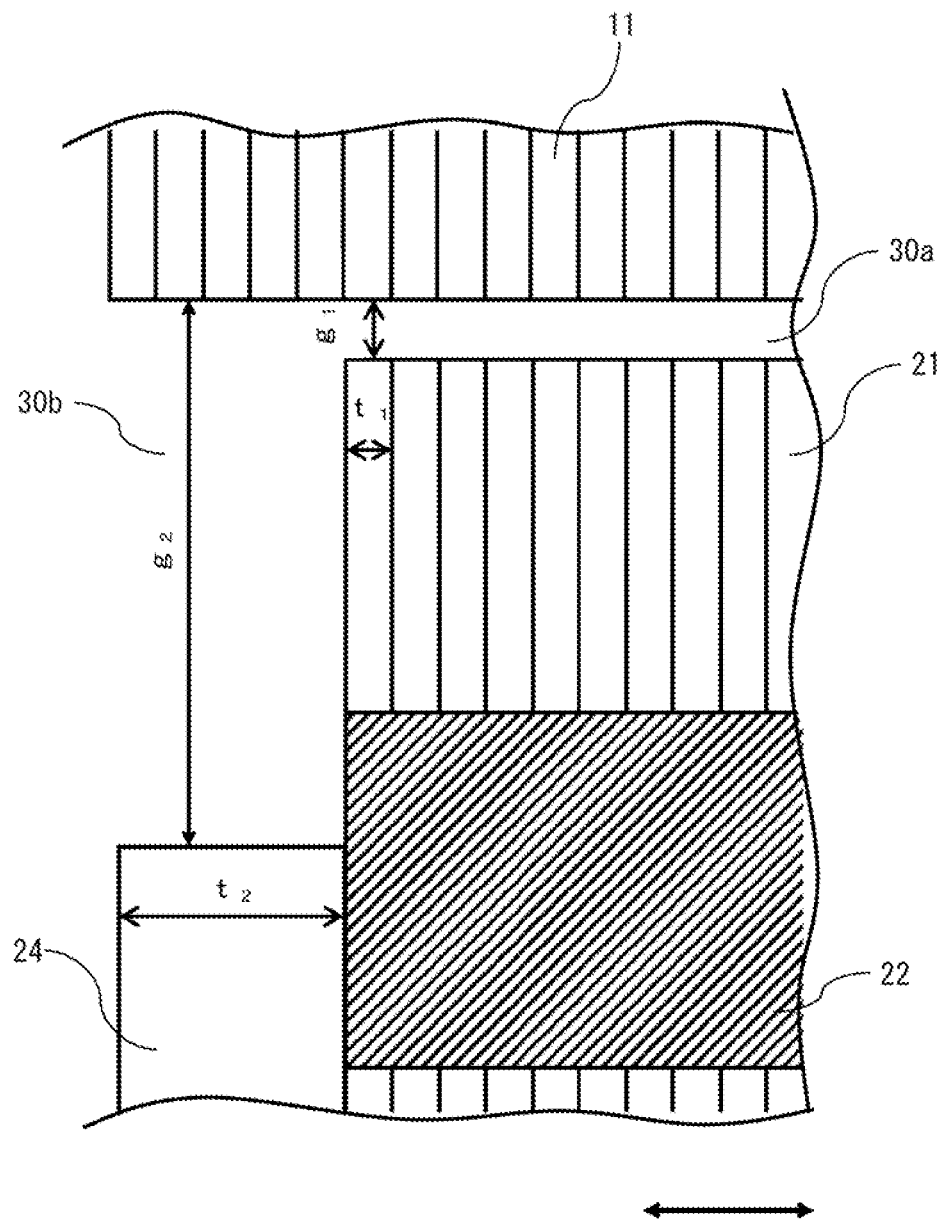
FIG. 11 is a cross-sectional view showing a major part of another rotary electric machine according to the first embodiment.

In addition, in the configuration shown in FIG. 2, the radially outer end surface of the magnetic end plate 24 is located radially inward of the radially outer end surface of the rotor core 21 and is located radially outward of a radially outer end surface of the magnet 22. The present disclosure is not limited to the configuration in which the magnetic end plate 24 is in contact with the magnet 22 such that the magnetic end plate 24 covers the entire end surface of the magnet 22 in this manner. As shown in FIG. 11, the magnetic end plate 24 may be disposed so as to cover at least a part of the end surface of the magnet 22. In the configuration shown in FIG. 11, the radially outer end surface of the magnetic end plate 24 is located radially inward of the radially outer end surface of the magnet 22 and is located radially outward of the radially inner end surface of the magnet 22. In such a configuration, the end plate distance 30b is elongated while the function of holding the magnet 22 is maintained. Thus, the effect of setting the heat generated from the magnetic end plate 24 to be lower than the heat generated from the rotor core 21, can be further obtained.

The thickness per electromagnetic steel sheet of the rotor core 21 and the thickness per magnetic sheet of the magnetic end plate 24 may be set to be equal to each other. If these thicknesses are equal to each other, skin effects have the same level of influence. Thus, the effect of setting the heat generated from the magnetic end plate 24 to be lower than the heat generated from the rotor core 21, can be obtained. The material of the magnetic end plate 24 may be the same as each electromagnetic steel sheet which is the material of the rotor core 21. If these materials are the same as each other, skin effects have the same level of influence. Thus, the effect of setting the heat generated from the magnetic end plate 24 to be lower than the heat generated from the rotor core 21, can be obtained.

The magnetic permeability of the magnetic end plate 24 is desirably lower than the magnetic permeability of the electromagnetic steel sheet of the rotor core 21. If the magnetic permeability of the magnetic end plate 24 is lower than the magnetic permeability of the electromagnetic steel sheet of the rotor core 21, the amount of magnetic flux that interlinks with the magnetic end plate 24 is decreased. Thus, the effect of setting the heat generated from the magnetic end plate 24 to be lower than the heat generated from the rotor core 21, can be obtained. The material of the magnetic end plate 24 having a lower magnetic permeability than the electromagnetic steel sheet is, for example, carbon steel or stainless steel.

Figure 12:
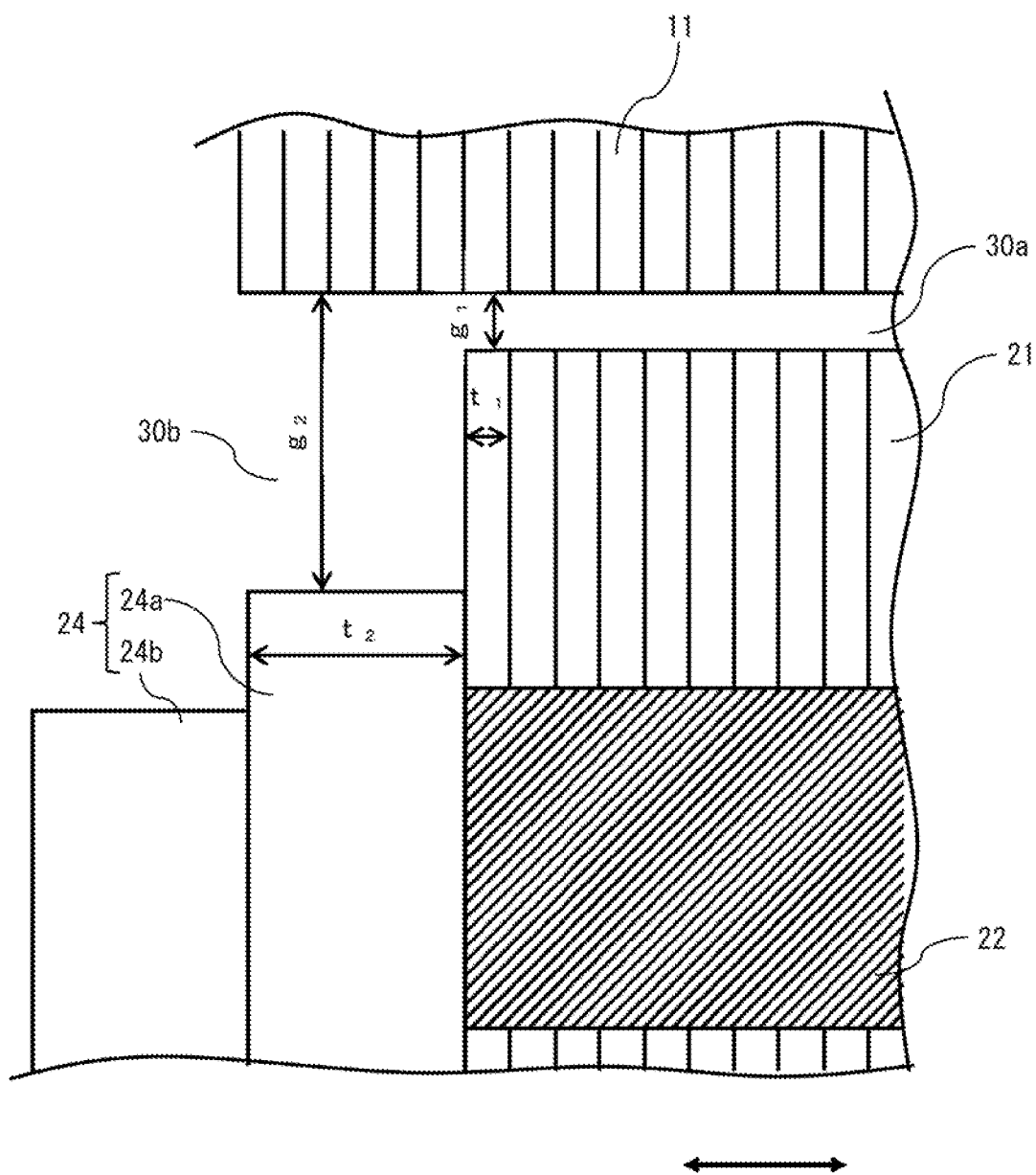
FIG. 12 is a cross-sectional view showing a major part of another rotary electric machine according to the first embodiment.

Although the magnetic end plate 24 composed of a single magnetic sheet is provided in the configuration shown in FIG. 2, the number of the magnetic end plates 24 is not limited to one and may be more than one. In FIG. 12, two magnetic end plates 24a and 24b are disposed. The sizes in the radial direction of a plurality of the provided magnetic end plates 24 may differ from each other. If a plurality of the magnetic end plates 24 are provided, the thickness $t_1$ of each electromagnetic steel sheet, the thickness $t_2$ of each magnetic sheet, the electrical conductivity $\sigma_1$ of the electromagnetic steel sheet, the electrical conductivity $\sigma_2$ of the magnetic sheet, the rotor core distance $g_1$, and the end plate distance $g_2$ are set such that at least a magnetic sheet that is in contact with one or each of the end surface on the one side in the axial direction of the rotor core 21 and the end surface on the other side in the axial direction of the rotor core 21 satisfies expression (1). Heat generation from the magnetic end plate 24a that is closer to the rotor core 21 inflicts a greater influence on the rotor core 21, and heat generated from the magnetic end plate 24a that is closer to the rotor core 21 becomes equal to or lower than the heat generated from the rotor core 21. Thus, it is possible to provide a permanent-magnet-type rotary electric machine in which a failure is assuredly prevented. Since the second magnetic end plate 24b that is farther from the rotor core 21 is provided, the function of holding the rotor core 21 and the magnet 22 can be more improved. If the magnetic end plate 24b also satisfies expression (1), the heat dissipation quality of the magnetic end plate 24a can be improved.

As described above, the rotary electric machine 1 according to the first embodiment includes: the rotor core 21 having the magnet 22; the stator core 11; and the magnetic end plate 24 in contact with one or each of the end surface on the one side in the axial direction of the rotor core 21 and the end surface on the other side in the axial direction of the rotor core 21. The heat generated from the magnetic end plate 24 owing to eddy current that is generated in the magnetic end plate 24 by magnetic flux from the stator core 11 is equal to or lower than the heat generated from the rotor core 21 owing to eddy current that is generated in the rotor core 21 by magnetic flux from the stator core 11. This makes it possible to provide a permanent-magnet-type rotary electric machine in which: the heat generated from the magnetic end plate 24 is equal to or lower than the heat generated from the rotor core 21; and irreversible demagnetization of the magnet 22 and decrease of the function of fixing the magnet 22 by the magnetic end plate 24 are suppressed so that a failure is prevented.

If the radially outer end surface of the magnetic end plate 24 is located radially inward of the radially outer end surface of the rotor core 21 and is located radially outward of the radially inner end surface of the magnet 22, and the thickness per electromagnetic steel sheet of the rotor core 21, the thickness per magnetic sheet of the magnetic end plate 24, the electrical conductivity of the electromagnetic steel sheet of the rotor core 21, the electrical conductivity of the magnetic sheet of the magnetic end plate 24, the rotor core distance 30a, and the end plate distance 30b are set such that the heat generated from the magnetic end plate 24 owing to eddy current that is generated in the magnetic end plate 24 by magnetic flux from the stator core 11 becomes equal to or lower than the heat generated from the rotor core 21 owing to eddy current that is generated in the rotor core 21 by magnetic flux from the stator core 11, it is possible to provide a permanent-magnet-type rotary electric machine in which: the heat generated from the magnetic end plate 24 is equal to or lower than the heat generated from the rotor core 21; and irreversible demagnetization of the magnet 22 and decrease of the function of fixing the magnet 22 by the magnetic end plate 24 are easily suppressed so that a failure is prevented.

If the thickness $t_1$ of the electromagnetic steel sheet, the thickness $t_2$ of the magnetic sheet, the electrical conductivity $\sigma_1$ of the electromagnetic steel sheet, the electrical conductivity $\sigma_2$ of the magnetic sheet, the rotor core distance $g_1$, and the end plate distance $g_2$ are set such that at least one magnetic sheet of the magnetic end plate 24 satisfies expression (1), it is possible to provide a permanent-magnet-type rotary electric machine in which: the heat generated from the magnetic end plate 24 is equal to or lower than the heat generated from the rotor core 21; and irreversible demagnetization of the magnet 22 and decrease of the function of fixing the magnet 22 by the magnetic end plate 24 are easily suppressed so that a failure is prevented.

If the thickness per electromagnetic steel sheet of the rotor core 21 and the thickness per magnetic sheet of the magnetic end plate 24 are equal to each other, skin effects have the same level of influence. Thus, the effect of setting the heat generated from the magnetic end plate 24 to be lower than the heat generated from the rotor core 21, can be obtained. In addition, if the material of the magnetic end plate 24 is the same as each electromagnetic steel sheet which is the material of the rotor core 21, skin effects have the same level of influence. Thus, the effect of setting the heat generated from the magnetic end plate 24 to be lower than the heat generated from the rotor core 21, can be obtained.

If the magnetic permeability of the magnetic end plate 24 is lower than the magnetic permeability of the electromagnetic steel sheet of the rotor core 21, the amount of magnetic flux that interlinks with the magnetic end plate 24 is decreased. Thus, the effect of setting the heat generated from the magnetic end plate 24 to be lower than the heat generated from the rotor core 21, can be obtained. If the magnetic end plate 24 is in contact with one or each of the end surface on the one side in the axial direction of the rotor core 21 and the end surface on the other side in the axial direction of the rotor core 21 and has a plurality of magnetic sheets stacked in the axial direction, and the thickness $t_1$ of each electromagnetic steel sheet, the thickness $t_2$ of each magnetic sheet, the electrical conductivity $\sigma_1$ of the electromagnetic steel sheet, the electrical conductivity $\sigma_2$ of the magnetic sheet, the rotor core distance $g_1$, and the end plate distance $g_2$ are set such that at least the magnetic sheet that is in contact with one or each of the end surface on the one side in the axial direction of the rotor core 21 and the end surface on the other side in the axial direction of the rotor core 21, satisfies expression (1), heat generation from the magnetic end plate 24a that is closer to the rotor core 21 inflicts a greater influence on the rotor core 21 and the heat generated from the magnetic end plate 24a that is closer to the rotor core 21 becomes equal to or lower than the heat generated from the rotor core 21. Thus, it is possible to provide a permanent-magnet-type rotary electric machine in which a failure is assuredly prevented.

Second Embodiment

Figure 13:
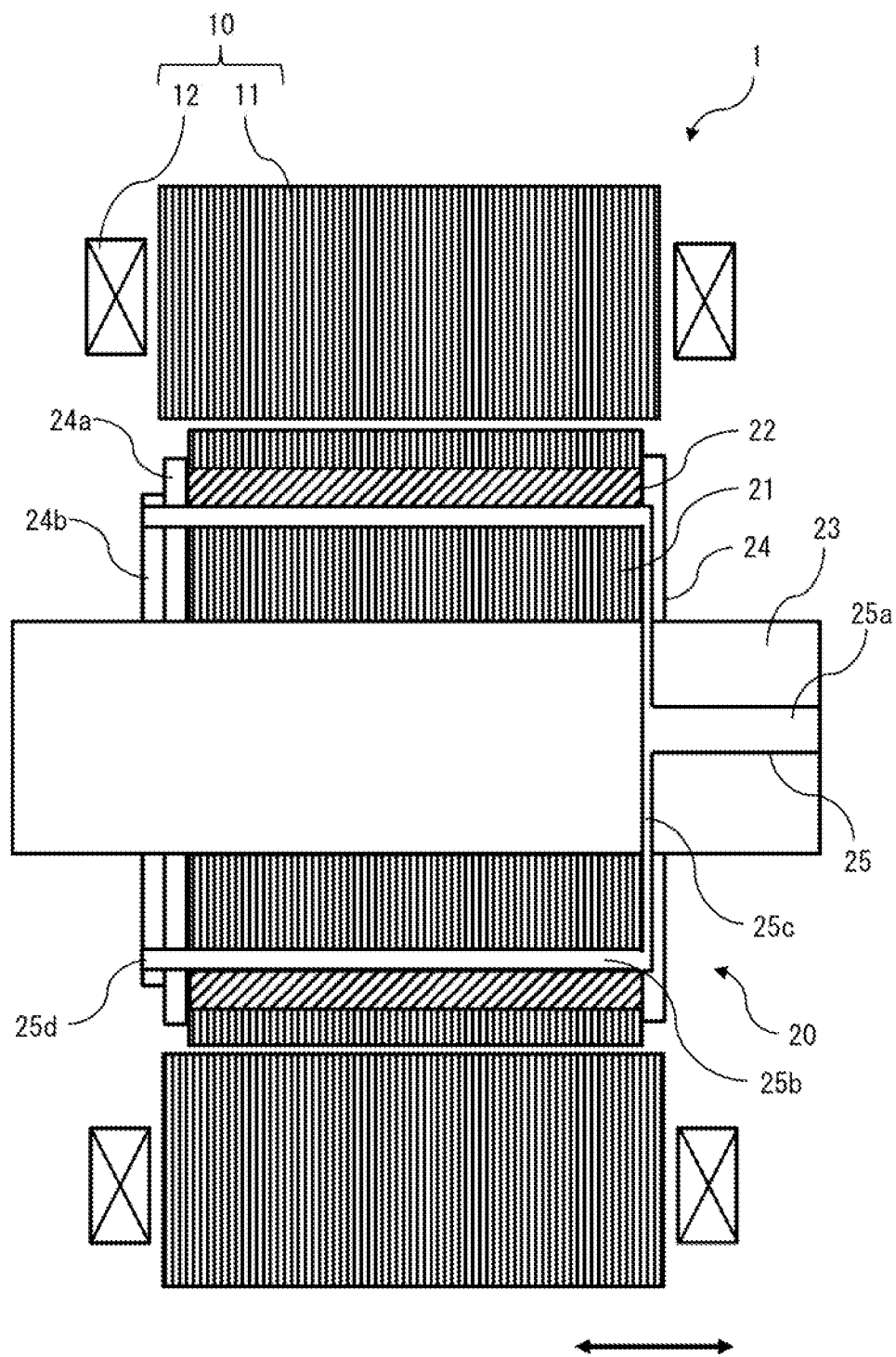
FIG. 13 is a cross-sectional view schematically showing a rotary electric machine according to a second embodiment.
Figure 14:
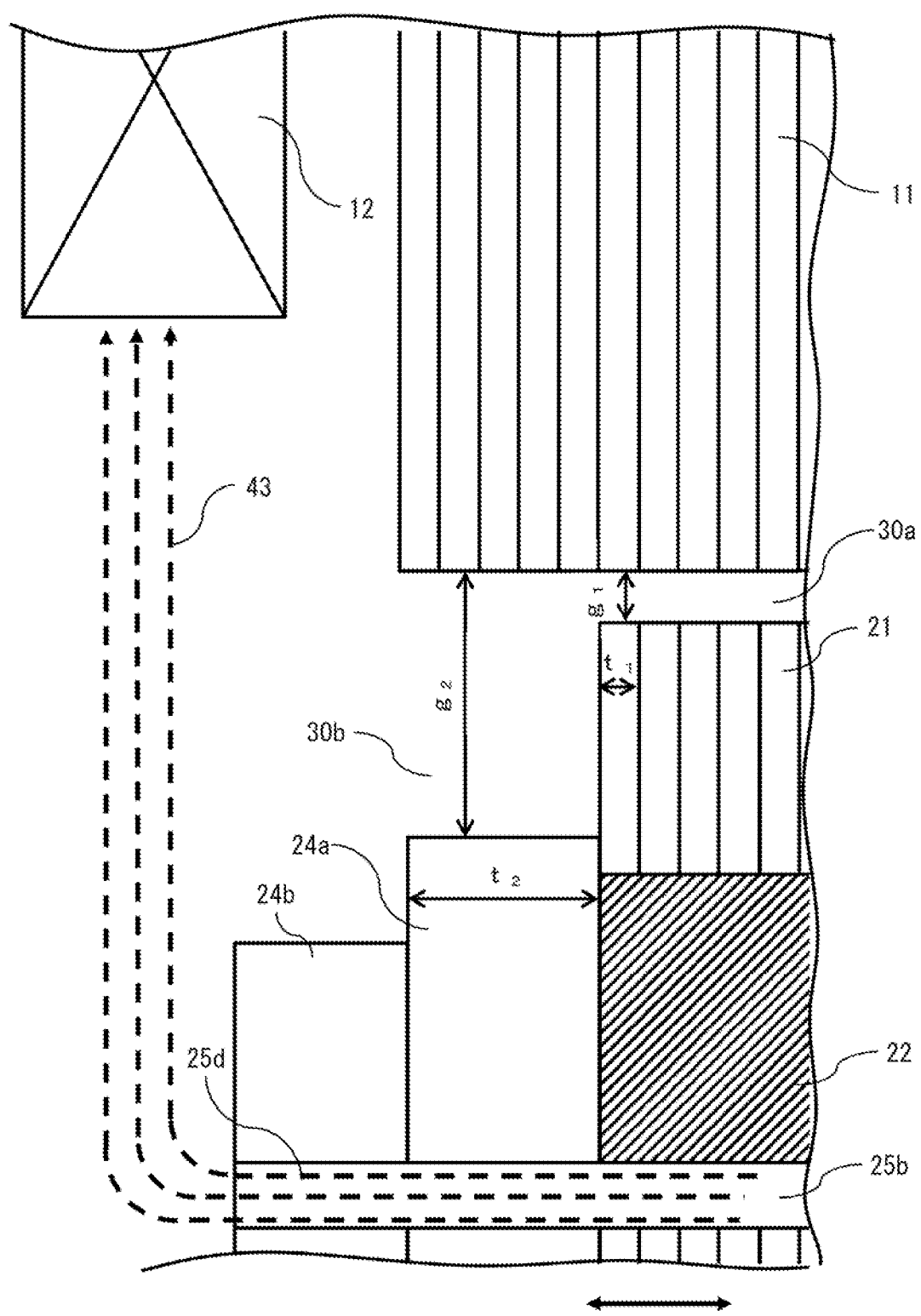
FIG. 14 is a cross-sectional view showing a major part of the rotary electric machine according to the second embodiment.

A rotary electric machine 1 according to a second embodiment will be described. FIG. 13 is a cross-sectional view schematically showing the rotary electric machine 1 according to the second embodiment, and is a diagram in which the rotary electric machine 1 is cut in the axial direction. FIG. 14 is a cross-sectional view showing a major part of the rotary electric machine 1, and is an enlarged view of a portion around the radially outer side of each of the magnetic end plates 24a and 24b. The rotary electric machine 1 according to the second embodiment includes a coolant flow path 25.

The rotary electric machine 1 includes the coolant flow path 25 through which a coolant flows. The coolant is, for example, air. The rotary electric machine 1 includes a magnetic end plate on at least the one side in the axial direction of the rotor core 21. In the present embodiment, as shown in FIG. 13, the magnetic end plates 24a and 24b are provided on the one side in the axial direction, and the magnetic end plate 24 is provided on the other side in the axial direction. By causing the coolant to flow through the coolant flow path 25, the rotor core 21, the magnet 22, and the magnetic end plates 24, 24a, and 24b are cooled.

The coolant flow path 25 is composed of a shaft member flow path 25a, a penetrating flow path 25b, a communication flow path 25c, and an end plate through hole 25d. The shaft member flow path 25a is a flow path which is provided in the shaft 23 and into which the coolant is supplied. The penetrating flow path 25b is a flow path penetrating, in the axial direction, a portion of the rotor core 21 that is located radially inward of the magnet 22. The communication flow path 25c is a flow path through which the shaft member flow path 25a and the penetrating flow path 25b are in communication with each other. The end plate through hole 25d is a hole that is in communication with the penetrating flow path 25b and that penetrates, in the axial direction, the magnetic end plates 24a and 24b provided on the one side in the axial direction. In an enlarged view shown in FIG. 14, a coolant 43 which passes through the penetrating flow path 25b and the end plate through hole 25d and flows to outside, is indicated by broken-line arrows.

The coil 12 extending from the rotor core 21 to the one side in the axial direction is wound on the stator core 11 to a location in the axial direction that is closer to the one side in the axial direction than an end surface on the one side in the axial direction of the magnetic end plate 24b provided on the one side in the axial direction is. When the rotor 20 is rotated, the coolant 43 having passed through the end plate through hole 25d heads for the coil 12. Therefore, the coolant 43 can cool the coil 12 in addition to the rotor core 21, the magnet 22, and the magnetic end plates 24, 24a, and 24b.

As described above, the rotary electric machine 1 according to the second embodiment further includes the coolant flow path 25 through which the coolant 43 flows, the coolant flow path 25 is composed of the shaft member flow path 25a, the penetrating flow path 25b, the communication flow path 25c, and the end plate through hole 25d, and the coil 12 extending from the rotor core 21 to the one side in the axial direction is wound on the stator core 11 to a location in the axial direction that is closer to the one side in the axial direction than the end surface on the one side in the axial direction of the magnetic end plate 24b provided on the one side in the axial direction is. Consequently, the coolant 43 can cool the coil 12 in addition to the rotor core 21, the magnet 22, and the magnetic end plates 24, 24a, and 24b. Thus, the magnetic end plates 24, 24a, and 24b can be efficiently cooled, and the coil 12 which is a heat generating portion can be efficiently cooled.

Although the thickness, the outer diameter, and the material of the magnetic end plate 24 are described as being uniform in the first and second embodiments, any or all of the thickness, the outer diameter, and the material of the magnetic end plate 24 may be non-uniform. The same advantageous effects are exhibited also in a configuration in which any or all of the thickness, the outer diameter, and the material are non-uniform.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent parts may be modified, added, or eliminated. At least one of the constituent parts mentioned in at least one of the preferred embodiments may be selected and combined with the constituent parts mentioned in another preferred embodiment.

DESCRIPTION OF THE REFERENCE CHARACTERS 1 rotary electric machine
10 stator
11 stator core
12 coil
20 rotor
21 rotor core
22 magnet
23 shaft
24 magnetic end plate
25 coolant flow path
25a shaft member flow path
25b penetrating flow path
25c communication flow path
25d end plate through hole
30a rotor core distance
30b end plate distance
41 magnetic flux
42 eddy current
43 coolant

What is claimed is:

1. A rotary electric machine comprising:
a rotor core configured to rotate integrally with a rotation shaft and having electromagnetic steel sheets stacked in an axial direction;
a stator core having electromagnetic steel sheets stacked in the axial direction, the stator core being disposed radially outward of the rotor core so as to be apart from the rotor core;
a magnet inserted in each of a plurality of through holes which penetrate the rotor core in the axial direction and which are located to be apart from each other in a circumferential direction; and
a magnetic end plate in contact with one or each of an end surface on one side in the axial direction of the rotor core and an end surface on another side in the axial direction of the rotor core, and having a single magnetic sheet or a plurality of magnetic sheets stacked in the axial direction, wherein
heat generated from the magnetic end plate owing to eddy current that is generated in the magnetic end plate by magnetic flux from the stator core is equal to or lower than heat generated from the rotor core owing to eddy current that is generated in the rotor core by magnetic flux from the stator core,
wherein a thickness per electromagnetic steel sheet of the rotor core, a thickness per magnetic sheet of the magnetic end plate, an electrical conductivity of the electromagnetic steel sheet of the rotor core, an electrical conductivity of the magnetic sheet of the magnetic end plate, a rotor core distance which is a distance in a radial direction between a location in the radial direction of a radially inner end surface of the stator core and a location in the radial direction of the radially outer end surface of the rotor core, and an end plate distance which is a distance in the radial direction between the location in the radial direction of the radially inner end surface of the stator core and a location in the radial direction of the radially outer end surface of the magnetic end plate satisfy:

$$((t_2^2 \cdot \sigma_2)/(t_1^2 \cdot \sigma_1)) \leq (g_2^2/g_1^2),$$

where the thickness of the electromagnetic steel sheet is defined as $t_1$, the thickness of the magnetic sheet is defined as $t_2$, the electrical conductivity of the electromagnetic steel sheet is defined as $\sigma_1$, the electrical conductivity of the magnetic sheet is defined as $\sigma_2$, the rotor core distance is defined as $g_1$, and the end plate distance is defined as $g_2$.

2. The rotary electric machine according to claim 1, wherein
a radially outer end surface of the magnetic end plate is located radially inward of a radially outer end surface of the rotor core and is located radially outward of a radially inner end surface of the magnet, and
the thickness per electromagnetic steel sheet of the rotor core, the thickness per magnetic sheet of the magnetic end plate, an electrical conductivity of the electromagnetic steel sheet of the rotor core, the electrical conductivity of the magnetic sheet of the magnetic end plate, the rotor core distance which is a distance in a radial direction between a location in the radial direction of a radially inner end surface of the stator core and a location in the radial direction of the radially outer end surface of the rotor core, and the end plate distance are set such that the heat generated from the magnetic end plate owing to the eddy current that is generated in the magnetic end plate by the magnetic flux from the stator core becomes equal to or lower than the heat generated from the rotor core owing to the eddy current that is generated in the rotor core by the magnetic flux from the stator core.

3. The rotary electric machine according to claim 2, further comprising
a coolant flow path through which a coolant flows, wherein
the magnetic end plate is provided on at least the one side in the axial direction of the rotor core,
the coolant flow path is composed of
a shaft member flow path which is provided in the rotation shaft and into which the coolant is supplied,
a penetrating flow path penetrating, in the axial direction, a portion of the rotor core that is located radially inward of the magnet,
a communication flow path through which the shaft member flow path and the penetrating flow path are in communication with each other, and
an end plate through hole in communication with the penetrating flow path, the end plate through hole penetrating, in the axial direction, the magnetic end plate provided on the one side in the axial direction, and
a coil wounded on the stator and extending from one axial end of the stator that is close to the magnetic end plate to another axial end of the stator.

4. The rotary electric machine according to claim 1, wherein
the thickness of the electromagnetic steel sheet and the thickness of the magnetic sheet are equal to each other.

5. The rotary electric machine according to claim 4, further comprising
a coolant flow path through which a coolant flows, wherein
the magnetic end plate is provided on at least the one side in the axial direction of the rotor core,
the coolant flow path is composed of
a shaft member flow path which is provided in the rotation shaft and into which the coolant is supplied,
a penetrating flow path penetrating, in the axial direction, a portion of the rotor core that is located radially inward of the magnet,
a communication flow path through which the shaft member flow path and the penetrating flow path are in communication with each other, and
an end plate through hole in communication with the penetrating flow path, the end plate through hole penetrating, in the axial direction, the magnetic end plate provided on the one side in the axial direction, and
a coil wounded on the stator and extending from one axial end of the stator that is close to the magnetic end plate to another axial end of the stator.

6. The rotary electric machine according to claim 1, wherein
a material of the magnetic end plate is the same as the electromagnetic steel sheet which is a material of the rotor core.

7. The rotary electric machine according to claim 6, further comprising
a coolant flow path through which a coolant flows, wherein
the magnetic end plate is provided on at least the one side in the axial direction of the rotor core,
the coolant flow path is composed of
a shaft member flow path which is provided in the rotation shaft and into which the coolant is supplied,
a penetrating flow path penetrating, in the axial direction, a portion of the rotor core that is located radially inward of the magnet,
a communication flow path through which the shaft member flow path and the penetrating flow path are in communication with each other, and
an end plate through hole in communication with the penetrating flow path, the end plate through hole penetrating, in the axial direction, the magnetic end plate provided on the one side in the axial direction, and
a coil wounded on the stator and extending from one axial end of the stator that is close to the magnetic end plate to another axial end of the stator.

8. The rotary electric machine according to claim 1, wherein
a magnetic permeability of the magnetic end plate is lower than a magnetic permeability of the electromagnetic steel sheet of the rotor core.

9. The rotary electric machine according to claim 8, further comprising
a coolant flow path through which a coolant flows, wherein
the magnetic end plate is provided on at least the one side in the axial direction of the rotor core,
the coolant flow path is composed of
a shaft member flow path which is provided in the rotation shaft and into which the coolant is supplied,
a penetrating flow path penetrating, in the axial direction, a portion of the rotor core that is located radially inward of the magnet,
a communication flow path through which the shaft member flow path and the penetrating flow path are in communication with each other, and
an end plate through hole in communication with the penetrating flow path, the end plate through hole penetrating, in the axial direction, the magnetic end plate provided on the one side in the axial direction, and
a coil wounded on the stator and extending from one axial end of the stator that is close to the magnetic end plate to another axial end of the stator.

10. The rotary electric machine according to claim 1, wherein
the magnetic end plate is in contact with one or each of the end surface on the one side in the axial direction of the rotor core and the end surface on the other side in the axial direction of the rotor core, and has a plurality of magnetic sheets stacked in the axial direction.

11. The rotary electric machine according to claim 10, further comprising
a coolant flow path through which a coolant flows, wherein
the magnetic end plate is provided on at least the one side in the axial direction of the rotor core,
the coolant flow path is composed of
a shaft member flow path which is provided in the rotation shaft and into which the coolant is supplied,
a penetrating flow path penetrating, in the axial direction, a portion of the rotor core that is located radially inward of the magnet,
a communication flow path through which the shaft member flow path and the penetrating flow path are in communication with each other, and
an end plate through hole in communication with the penetrating flow path, the end plate through hole penetrating, in the axial direction, the magnetic end plate provided on the one side in the axial direction, and
a coil wounded on the stator and extending from one axial end of the stator that is close to the magnetic end plate to another axial end of the stator.

12. The rotary electric machine according to claim 1, further comprising
a coolant flow path through which a coolant flows, wherein
the magnetic end plate is provided on at least the one side in the axial direction of the rotor core,
the coolant flow path is composed of
a shaft member flow path which is provided in the rotation shaft and into which the coolant is supplied,
a penetrating flow path penetrating, in the axial direction, a portion of the rotor core that is located radially inward of the magnet,
a communication flow path through which the shaft member flow path and the penetrating flow path are in communication with each other, and
an end plate through hole in communication with the penetrating flow path, the end plate through hole penetrating, in the axial direction, the magnetic end plate provided on the one side in the axial direction, and a coil wounded on the stator and extending from one axial end of the stator that is close to the magnetic end plate to another axial end of the stator.

13. A rotary electric machine comprising:
a rotor core configured to rotate integrally with a rotation shaft and having electromagnetic steel sheets stacked in an axial direction;
a stator core having electromagnetic steel sheets stacked in the axial direction, the stator core being disposed radially outward of the rotor core so as to be apart from the rotor core;
a magnet inserted in each of a plurality of through holes which penetrate the rotor core in the axial direction and which are located to be apart from each other in a circumferential direction; and
a magnetic end plate in contact with one or each of an end surface on one side in the axial direction of the rotor core and an end surface on another side in the axial direction of the rotor core, and having a single magnetic sheet or a plurality of magnetic sheets stacked in the axial direction, wherein
heat generated from the magnetic end plate owing to eddy current that is generated in the magnetic end plate by magnetic flux from the stator core is equal to or lower than heat generated from the rotor core owing to eddy current that is generated in the rotor core by magnetic flux from the stator core,
wherein the thickness of the electromagnetic steel sheet and the thickness of the magnetic sheet are equal to each other,
wherein a material of the magnetic end plate is the same as the electromagnetic steel sheet which is a material of the rotor core, and
wherein if
the thickness of the electromagnetic steel sheet is defined as $t_1$,
the thickness of the magnetic sheet is defined as $t_2$,
the electrical conductivity of the electromagnetic steel sheet is defined as $\sigma_1$,
the electrical conductivity of the magnetic sheet is defined as $\sigma_2$,
the rotor core distance is defined as $g_1$, and
the end plate distance is defined as $g_2$,
the thickness of the electromagnetic steel sheet, the thickness of the magnetic sheet, the electrical conductivity of the electromagnetic steel sheet, the electrical conductivity of the magnetic sheet, the rotor core distance, and the end plate distance are set such that at least one magnetic sheet of the magnetic end plate satisfies $$((t_2^2 \cdot \sigma_2)/(t_1^2 \cdot \sigma_1)) \leq (g_2^2/g_1^2).$$

14. The rotary electric machine according to claim 13, wherein
a radially outer end surface of the magnetic end plate is located radially inward of a radially outer end surface of the rotor core and is located radially outward of a radially inner end surface of the magnet, and
the thickness per electromagnetic steel sheet of the rotor core, the thickness per magnetic sheet of the magnetic end plate, an electrical conductivity of the electromagnetic steel sheet of the rotor core, the electrical conductivity of the magnetic sheet of the magnetic end plate, the rotor core distance which is a distance in a radial direction between a location in the radial direction of a radially inner end surface of the stator core and a location in the radial direction of the radially outer end surface of the rotor core, and the end plate distance are set such that the heat generated from the magnetic end plate owing to the eddy current that is generated in the magnetic end plate by the magnetic flux from the stator core becomes equal to or lower than the heat generated from the rotor core owing to the eddy current that is generated in the rotor core by the magnetic flux from the stator core.

15. A rotary electric machine comprising:
a rotor core configured to rotate integrally with a rotation shaft and having electromagnetic steel sheets stacked in an axial direction;
a stator core having electromagnetic steel sheets stacked in the axial direction, the stator core being disposed radially outward of the rotor core so as to be apart from the rotor core;
a magnet inserted in each of a plurality of through holes which penetrate the rotor core in the axial direction and which are located to be apart from each other in a circumferential direction; and
a magnetic end plate in contact with one or each of an end surface on one side in the axial direction of the rotor core and an end surface on another side in the axial direction of the rotor core, and having a single magnetic sheet or a plurality of magnetic sheets stacked in the axial direction, wherein
heat generated from the magnetic end plate owing to eddy current that is generated in the magnetic end plate by magnetic flux from the stator core is equal to or lower than heat generated from the rotor core owing to eddy current that is generated in the rotor core by magnetic flux from the stator core,
wherein a magnetic permeability of the magnetic end plate is lower than a magnetic permeability of the electromagnetic steel sheet of the rotor core, and
wherein if
the thickness of the electromagnetic steel sheet is defined as $t_1$,
the thickness of the magnetic sheet is defined as $t_2$,
the electrical conductivity of the electromagnetic steel sheet is defined as $\sigma_1$,
the electrical conductivity of the magnetic sheet is defined as $\sigma_2$,
the rotor core distance is defined as $g_1$, and
the end plate distance is defined as $g_2$,
the thickness of the electromagnetic steel sheet, the thickness of the magnetic sheet, the electrical conductivity of the electromagnetic steel sheet, the electrical conductivity of the magnetic sheet, the rotor core distance, and the end plate distance are set such that at least one magnetic sheet of the magnetic end plate satisfies $$((t_2^2 \cdot \sigma_2)/(t_1^2 \cdot \sigma_1)) \leq (g_2^2/g_1^2).$$

16. The rotary electric machine according to claim 15, wherein
a radially outer end surface of the magnetic end plate is located radially inward of a radially outer end surface of the rotor core and is located radially outward of a radially inner end surface of the magnet, and
the thickness per electromagnetic steel sheet of the rotor core, the thickness per magnetic sheet of the magnetic end plate, an electrical conductivity of the electromagnetic steel sheet of the rotor core, the electrical conductivity of the magnetic sheet of the magnetic end plate, the rotor core distance which is a distance in a radial direction between a location in the radial direction of a radially inner end surface of the stator core and a location in the radial direction of the radially outer end surface of the rotor core, and the end plate distance are set such that the heat generated from the magnetic end plate owing to the eddy current that is generated in the magnetic end plate by the magnetic flux from the stator core becomes equal to or lower than the heat generated from the rotor core owing to the eddy current that is generated in the rotor core by the magnetic flux from the stator core.

* * * * *